United States Patent [19]
Yanagawa

[11] Patent Number: 5,381,394
[45] Date of Patent: Jan. 10, 1995

[54] OPTICAL PICKUP FOR AN OPTICAL DISC PLAYER

[75] Inventor: Naoharu Yanagawa, Saitama, Japan

[73] Assignee: Pioneer Electronic Corporation, Tokyo, Japan

[21] Appl. No.: 1,972

[22] Filed: Jan. 8, 1993

[30] Foreign Application Priority Data

Feb. 27, 1992 [JP] Japan .................................. 4-076023

[51] Int. Cl.[6] .............................................. G02B 26/08
[52] U.S. Cl. .................................. 369/100; 369/44.23; 369/112
[58] Field of Search ................ 369/103, 116, 107, 100, 369/118, 112, 44.23, 44.37, 44.38

[56] References Cited

U.S. PATENT DOCUMENTS

| | | | |
|---|---|---|---|
| 4,712,207 | 12/1987 | Reno | 369/100 |
| 5,223,970 | 6/1993 | Oono et al. | 369/112 |
| 5,235,581 | 8/1993 | Miyagawa et al. | 369/112 |

FOREIGN PATENT DOCUMENTS 61-220173 9/1986 Japan .
61-49731 10/1986 Japan .

*Primary Examiner*—Paul M. Dzierzynski
*Assistant Examiner*—Don Wong
*Attorney, Agent, or Firm*—Nikaido, Marmelstein, Murray & Oram

[57] ABSTRACT

An optical pickup for an optical disc player has a laser for emitting a laser beam for optical discs which are different from each other in recording density. The laser beam from the laser is divided into two beams by a beam splitter. A first objective is provided for focusing one of the laser beams on one of the optical discs. A beam expander is provided for expanding an intensity distribution in the optical axis. A second objective provided for focusing the expanded laser beam on the other disc with a spot having a larger diameter, 2 Claims, 5 Drawing Sheets

OPTICAL PICKUP FOR AN OPTICAL DISC PLAYER

BACKGROUND OF THE INVENTION

The present invention relates to an optical pickup for an optical disc player, and more particularly to a pickup having a single laser for recording and reproducing information on a disc having a different recording density.

There are optical discs such as a CD including a read only CD and a writable CD-R disc which is used as a ROM. Further, for writable optical discs having high recording densities, write-once discs and erasable discs are available. Information is recorded on the discs and reproduced with a laser beam. These discs are different from the CD in tile material of the recording surface.

For example, the write-once disc has a tellurium or bismuth recording surface on which the laser burns pits for recording. In another type of the write-once disks, the laser is focused on a recording surface coated with a selenium antimony ($Sb_2Se_3$) thin film, or an oxide tellurium (TeOx) thin film, or a thin film of organic pigment, changing the reflectivity of the light.

The erasable disc uses as the recording surface, an amorphous alloy made of rare earth metals such as gallium, terbium, and others. In a magneto-optical recording system, the recording surface of the disc is initially magnetized to form a magnetic field in a direction perpendicular to the surface. The laser heats a predetermined area of the disc to elevate the temperature above the Curie temperature, which is about 150° C., thereby reversing the direction of the magnetic field. To read the recorded information, the laser is irradiated on the recording surface so that a polarized wave front slightly rotates as a result of the Kerr effect. Thus only the polarized wave deflected by the rotation is read by a photodetector, thereby enabling to read the information.

Japanese Patent Application Laid-Open 61-220173 discloses a system for reproducing a CD having two areas the recording densities of which are different from each other. FIG. 8 shows the system. A laser beam emitted from a laser 1 is divided by a half mirror 2 into different directions. The beam in one of the directions is focused on a recording surface of an optical disc 7 through a beam splitter 3, a quarter-wave plate 4, a reflecting mirror 5, and an objective 6. The reflected beam from the disc 7 passes in reverse and is reflected by the beam splitter 3 and focused on a photodetector 9 through a cylindrical lens 8. The beam reflected on the half mirror 2 in the other direction is focused on the disc 7 through a reflecting mirror 10, a beam splitter 11, a quarter-wave plate 12, a reflecting mirror 13, and an objective 14. The reflected beam from the disc 7 is reflected on the beam splitter 11 and focused on the photodetector 9 through a cylindrical lens 15. The NA (numerical aperture) of the objective 14 is different from that of the objective 6 in accordance with the difference between the recording densities.

Japanese Patent Publication 61-49731 discloses another example of the system. FIG. 9 shows the system which comprises two lasers 16 and 17 each of which produces a laser beam having a different wavelength. The laser beam emitted from the laser 16 is focused on a disc (not shown) through a beam splitter 18, a half-wave plate 19, a beam splitter 20, a quarter-wave plate 21, and an objective (not shown). The reflected beam from the disc is reflected on the beam splitter 20 and focused on photodetector 22. The laser beam emitted from the laser 17 is reflected on the beam splitter 18 and focused on the disc in the same manner as the beam from the laser 16. The reflected beam from the disc is focused on the photodetector 22 in the same manner as hereinbefore described.

In the former system, it is necessary to provide the optical parts such as the beam splitter and the wave plate for the respective beams. Thus, the system is complicated in construction and the manufacturing cost are relatively high.

On the other hand, in the latter system, since two beams of the different wavelengths are focused on the disc, chromatic a aberration is produced. It is difficult to correct the aberration. Accordingly, it is impossible to reproduce two kinds of signals such as audio signal and a video signal recorded on the disc at the same time.

Furthermore, it is necessary to control a spot diameter of the laser beam in accordance with the recording density of the optical disc. If the disc has a high recording density, the beam must be focused on the disc at a small spot diameter. If the disc has a low recording density, the beam is focused on the disc at a large diameter. Therefore, if the beam having the large spot diameter is used for reproducing the information in the high recording density, crosstalk is produced between adjacent tracks and pits of short pitch can not be reproduced because of the large sport.

If the beam having the small spot diameter is used on the disc having the low recording density, intermodulation generates so that it is impossible to properly reproduce the information on the disc.

SUMMARY OF THE INVENTION

An object of the present invention is to provide an optical pickup which is simple in construction, thereby reducing the size of the pickup and the manufacturing costs.

Another object of the present invention is to provide a pickup which may record and reproduce information on optical discs having different recording densities.

According to the present invention, there is provided an optical pickup for an optical disc player having a laser for emitting a laser beam for optical discs which are different in recording density, comprising a beam splitter for dividing the laser beam from the laser into two beams, a first objective lens for focusing one of the laser beams on one of the optical discs, a beam expander for expanding an intensity distribution in the optical axis, and a second objective for focusing the expanded laser beam on the other disc.

In an optical pickup of the present invention, a laser beam is emitted from a single laser for recording and reproducing information on an optical disc having different recording densities. The laser beam is split into different directions. The beam in one of the directions is focused on the optical disc through a first objective. The beam in the other direction is expanded in the optical axis to reduce the diameter of the beam by a beam expander and the beam is focused on the disc through a second objective.

The other objects and features of this invention will become understood from the following description with reference to the accompanying drawings.

DETAILED DESCRIPTION OF THE PREFERRED EMBODIMENTS

Figure 1:
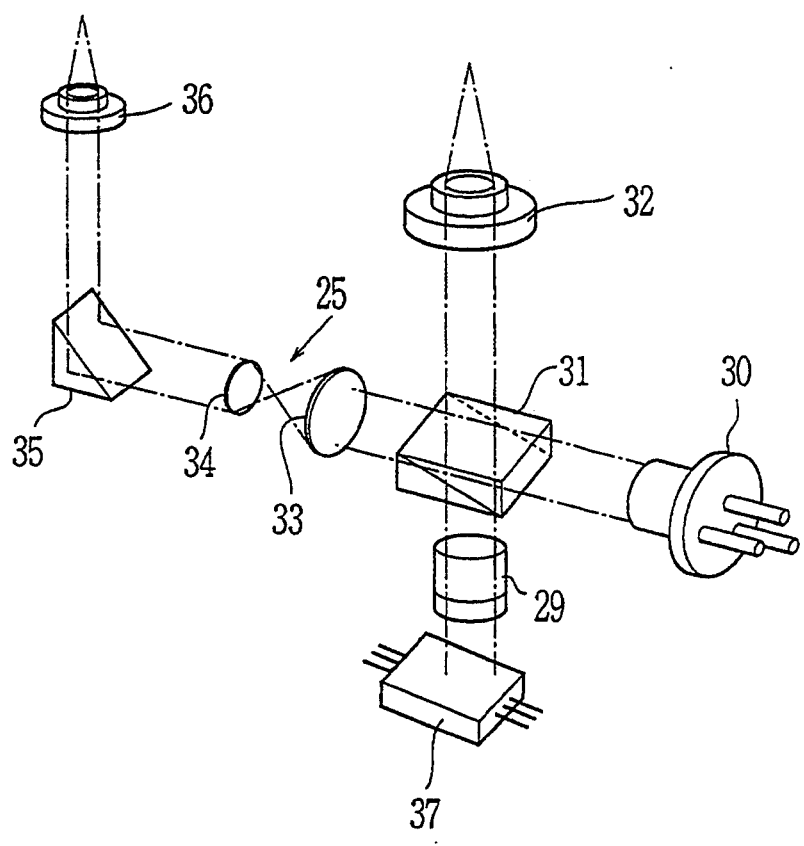
FIG. 1 is a perspective view schematically showing an optical pickup for an optical disc player according to the present invention.

Referring to FIG. 1 showing an optical pickup according to the present invention, a semiconductor laser 30 emits a laser beam which is reflected on a half mirror 31 as a beam splitter, and hence divided into two directions. The laser beam in one of the directions is focused on a first optical disc (not shown) through an objective 32. The reflected beam from the disc is focused on a photodetector 37 through the objective 32, the half mirror 31, and a cylindrical lens 29.

Figure 2:
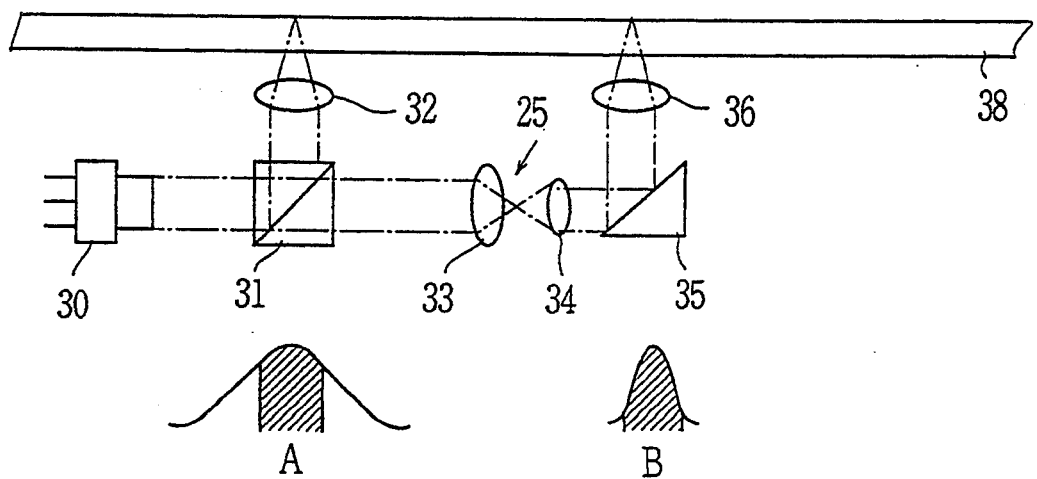
FIG. 2 is a schematic side view explaining an operation of the pickup.

The beam passing through the half mirror 31 enters a beam expander 25 comprising a large lens 33 and a small lens 34. The beam expander 25 has the function to expand the intensity (power) distribution of the light having a Gaussian distribution in the optical axis as shown in FIG. 2. The beam is reflected on a prism 35 in a vertical direction and focused on a second disc through an objective 36. The second disc has a lower recording density than the first disc. The pickup may be used for a single disc having areas the recording densities of which are different from each other. The reflected beam from the disc passes through the objective 36, prism 35, expander 25, and half mirror 31, and is focused on the photodetector 37 through the lens 29. The objectives 32 and 36 have the same numerical aperture (NA).

The operation of the pickup is described with reference to FIG. 2.

The laser beam emitted from the semiconductor laser 30 is reflected on the half mirror 31 and divided into the different directions, namely to the objective 32 and to the expander 25.

The laser beam directed to the objective 32 has a wide width Gaussian distribution A in its intensity distribution. The skirt of the Gaussian distribution has a sufficiently larger width than the diameter of the objective 32. Consequently, the side skirt of the distribution is largely truncated by the objective so that a central portion approximate to a plane wave shown by the hatching is irradiated on the disc.

On the other hand, the laser beam directed to the objective 36 is expanded in the optical axis as shown by the distribution B. As a result, the skirt of the distribution is slightly truncated.

Figure 3:
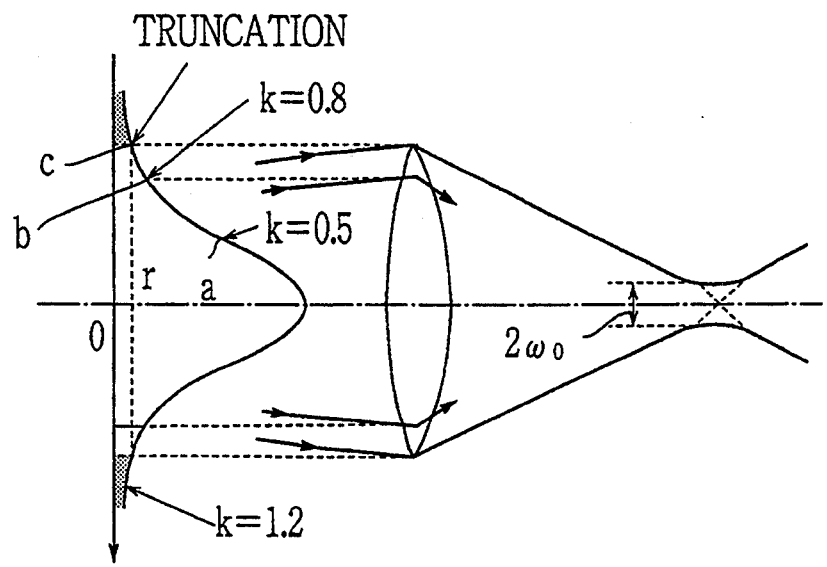
FIG. 3 is a diagram showing truncation of a laser beam.

Referring to FIG. 3 showing a Gaussian distribution of the laser beam, a spot diameter $2\omega 0$ of the beam focused on a disc (not shown) through a lens is determined by the NA of the lens and the wavelength of the beam and expressed by the equation as follows, $$2\omega 0 = k\lambda/NA \quad (1)$$

where k is constant.

Since the NAs of both lenses 32 and 36 are equal, the spot diameter is determined by the constant k.

In the Gaussian distribution of the light intensity, the constant k changes with the diameter of the beam profile incident on the lens. If the position of the profile on the distribution is at a position a where the light intensity is one-half of the central portion, the constant k is 0.5. The constant k at a position (position $e^{-2}$) is 0.8, and 1.2 at a zero position c. Namely, the constant k decreases as the amount of the truncation increases. Therefore, the spot diameter reduces as the truncation increases.

Thus, the spot of the beam focused on a disc 38 through the objective 36 has a large diameter because of the small truncation, and the spot of the beam passing through the objective 32 has a small diameter because of a large truncation.

Furthermore, the powers of the beams focused on the discs through the objectives 32 and 36 are equalized as described hereinafter.

If the Gaussian beam having the spot diameter $2\omega 0$ (FIG. 3) is transmitted through a circular opening having a radius R, the transmittance T is represented as follows:

$$T = 1 - \exp(-2m^2) \quad (2)$$

where $m = a/\omega 0$

Thus, if the transmittance of the half mirror 31 is t, the reflectance thereof is r, the truncation of the beam profile on the objective 32 reflected on the half mirror 31 is m1, and the truncation of the beam profile on the objective 36 compressed by the expander is m2, transmittances T1 and T2 of the objectives are represented as follows.

$$T1 = 1 - \exp(-2m1^2)$$

$$T2 = 1 - \exp(-2m2^2)$$

$$t:r = T1:T2$$

$$t \times T2 = r \times T1$$

$$t = (T1/T2)r \quad (3)$$

It will be seen from the equation, that if the transmittance t is $t = r \times T1/T2$, the beam powers on the disc are equalized.

Figure 4:
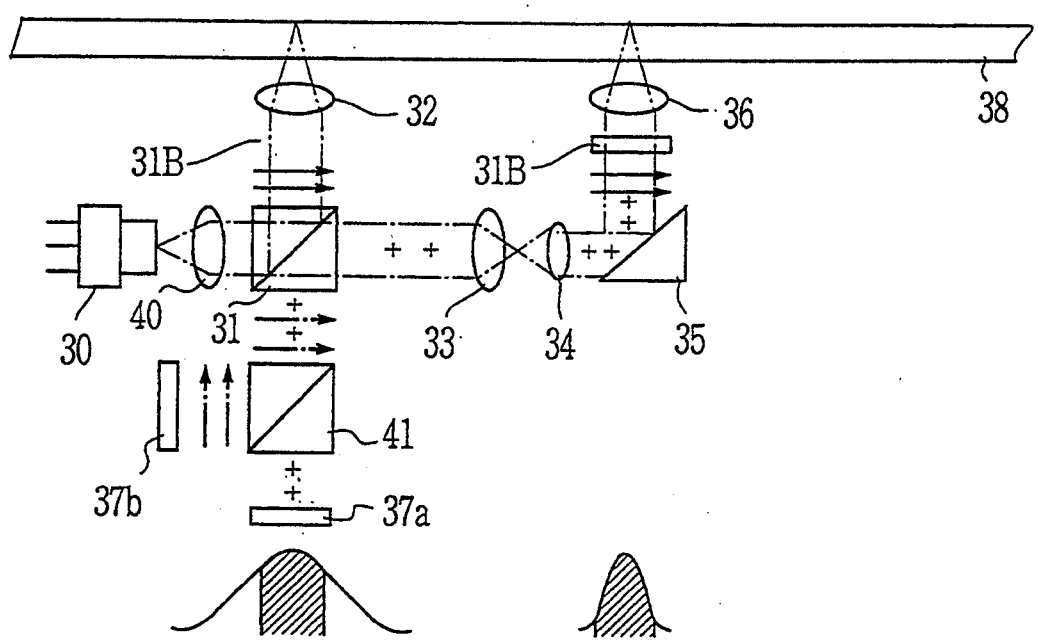
FIG. 4 is a diagram explaining an operation for the separation of a beam.

The separation of the reflected beam for the photodetector 37 is performed by polarizing the beam. As shown in FIG. 4, a collimator lens 40 is provided in front of the semiconductor laser 30, and a λ/4-wave plate 31B is disposed at the incident side of the objective 36. The reflected beam from the disc 38 is polarized by the λ/4-wave plate 31B in a direction perpendicular to the paper of the figure as shown by marks +. The polarized reflected beam passes the beam expander and is reflected on the half mirror 31. The beam is applied to a photodetector 37a passing through a polarizing beam splitter 41.

On the other hand, the reflected beam passing the objective 32 passes the half mirror 31 as shown by dotted line arrows and is reflected by the splitter 41 to a photodetector 37b.

Figure 5:
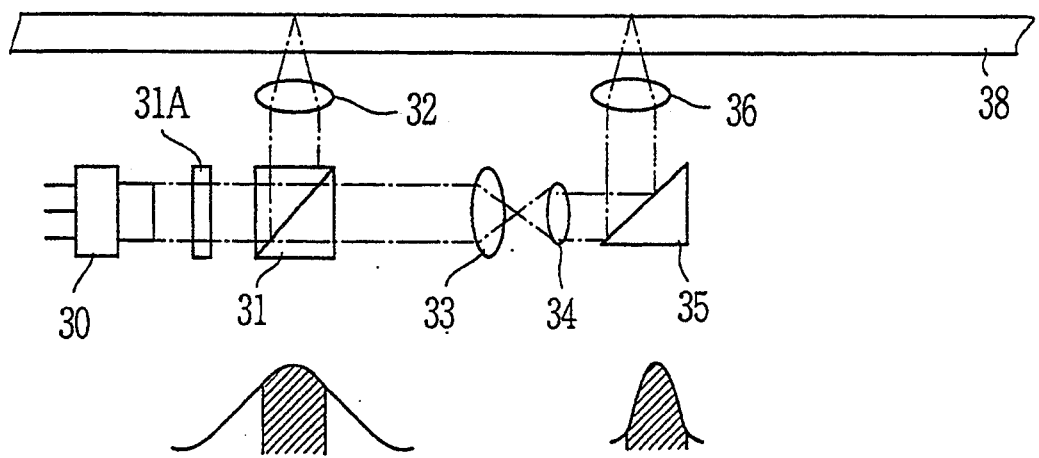
FIG. 5 is a diagram explaining an operation of a modification of the pickup.

If either of the objectives 32 and 36 is not used, the unused objective is defocused, thereby preventing the reflected beam from returning to the photodetector 37. Alternatively, as shown in FIG. 5, a λ/2-wave plate 31A is disposed in front of the semiconductor laser 30 to rotate the polarized light of the beam at 90 degrees so that the beam reflected only in one direction from the half mirror 31 is transmitted or reflected.

In accordance with the present invention, the optical pickup is provided with a single laser and means for focusing the laser beam from the laser onto the disc with different spot diameters. Therefore, the pickup is simplified in construction, and the size and the manufacturing cost thereof are reduced.

Figure 6:
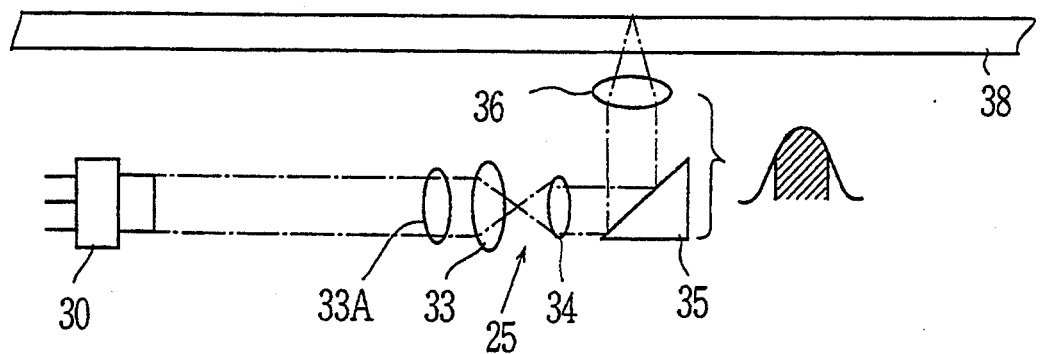
FIGS. 6a and 6b schematically show another embodiment of the present invention.
Figure 6:
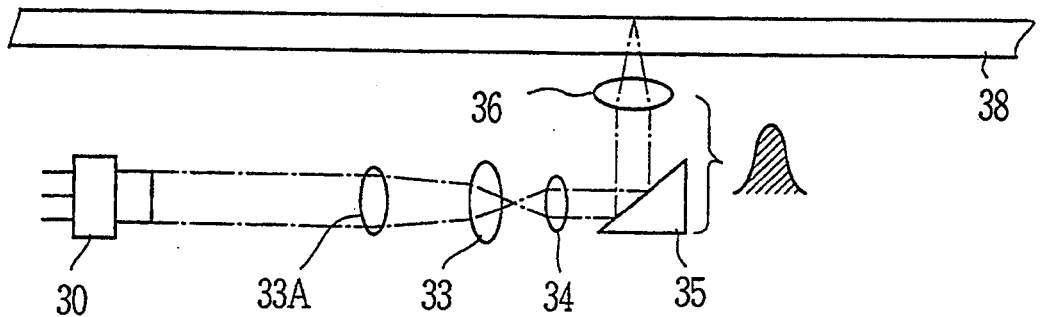

FIGS. 6a and 6b show another embodiment of the pickup. A lens 33A is variably disposed at the incident side of the large lens 33 of the expander 25 so as to form a zoom lens.

As shown in FIG. 6a, when the lens 33A is disposed near the lens 33, the truncation of the beam becomes large, so that a plane wave of the Gaussian distribution is used and the spot diameter is reduced.

As shown in FIG. 6b, when the lens 33A is disposed away from the lens 33, the spot diameter becomes large since the truncation is reduced.

In the embodiment, since the half mirror 31 and the objective 32 are omitted, the construction is further simplified.

Figure 7:
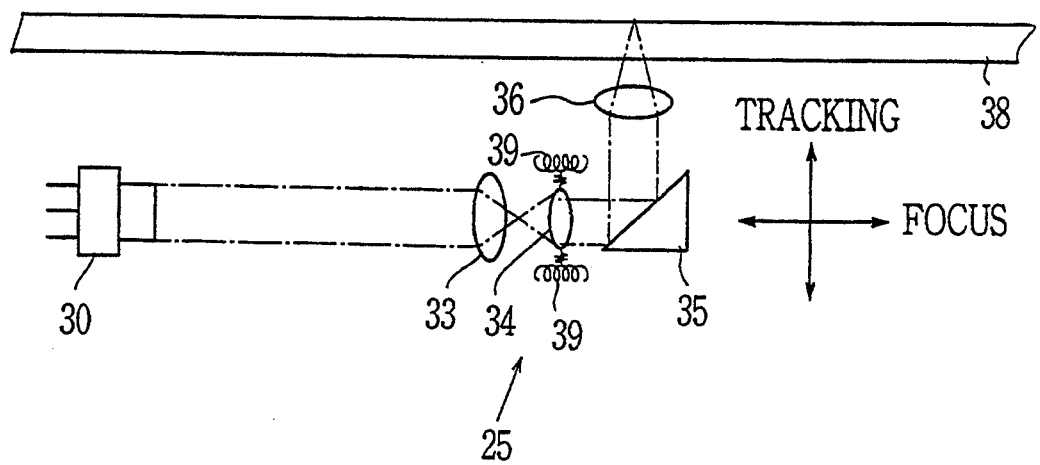
FIG. 7 schematically shows a further embodiment.
Figure 8:
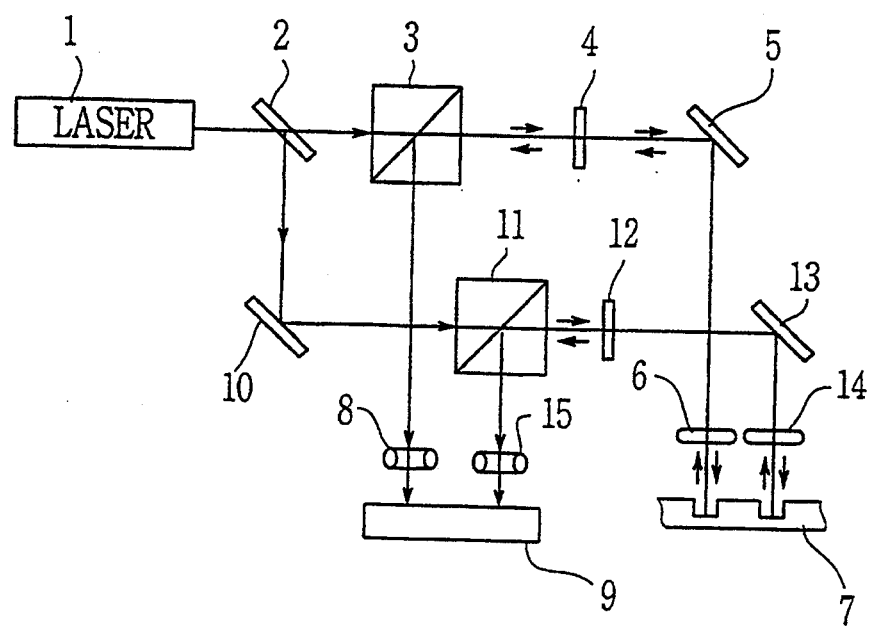
FIG. 8 is a diagram showing a conventional optical pickup.
Figure 9:
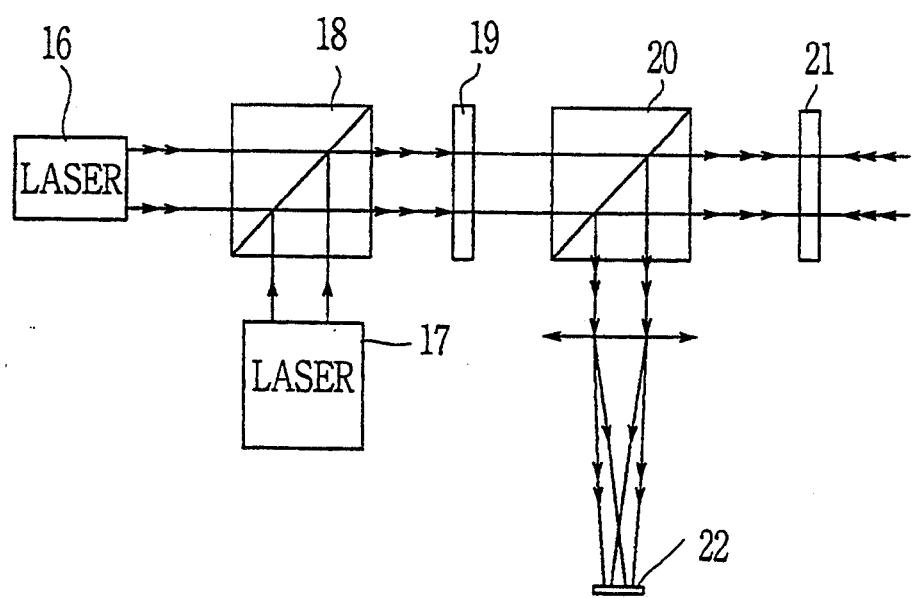
FIG. 9 is a diagram showing a part of another conventional pickup.

FIG. 7 shows a further embodiment. In the embodiment, actuators 39 are provided on the small lens 34 of the expander 25 to move the lens 34 in the focus direction and the tracking direction.

In the embodiment, since an actuator (not shown) of the objective 36 can be omitted, the weight of the optical pickup is reduced, so that the pickup can be moved at a high speed when searching the recorded information.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical pickup for an optical disc player having a laser for emitting a laser beam, and at least one objective for focusing the laser beam on optical discs which are different from each other in recording density, comprising:

a beam expander for expanding an intensity distribution of the laser beam, applied to a first optical disc having a low recording density, so that a first diameter of a spot is formed on the first optical disc by truncating a skirt of a Gaussian distribution of the laser beam by a first amount; and means for forming a second diameter of the spot of the laser beam, applied to a second optical disc having a high recording density, by truncating the skirt of the Gaussian distribution by a second amount, wherein said first diameter is larger than said second diameter and said first amount is smaller than said second amount.

2. An optical pickup according to claim 1, further comprising a zoom lens provided adjacent the beam expander for changing a shape of the intensity distribution to change an amount of truncation of the intensity distribution.

* * * * *